J. M. Mowrer.
Corn and Cob Crusher.

Nº 99,933.  Patented Feb. 15, 1870.

Witnesses:
D. J. Brown
R. D. Smith

Inventor:
Jacob M. Mowrer,
By his atty,
J. S. Brown

United States Patent Office.

JACOB M. MOWRER, OF MILHEIM, PENNSYLVANIA.

Letters Patent No. 99,933, dated February 15, 1870.

IMPROVEMENT IN CORN AND COB-CRUSHERS.

The Schedule referred to in these Letters Patent and making part of the same.

To all whom it may concern:

Be it known that I, JACOB M. MOWRER, of Milheim, in the county of Centre, and State of Pennsylvania, have invented an Improved Corn and Cob-Crusher; and I do hereby declare that the following is a full and exact description thereof, reference being had to the accompanying drawings making part of this specification.

Figure 1:
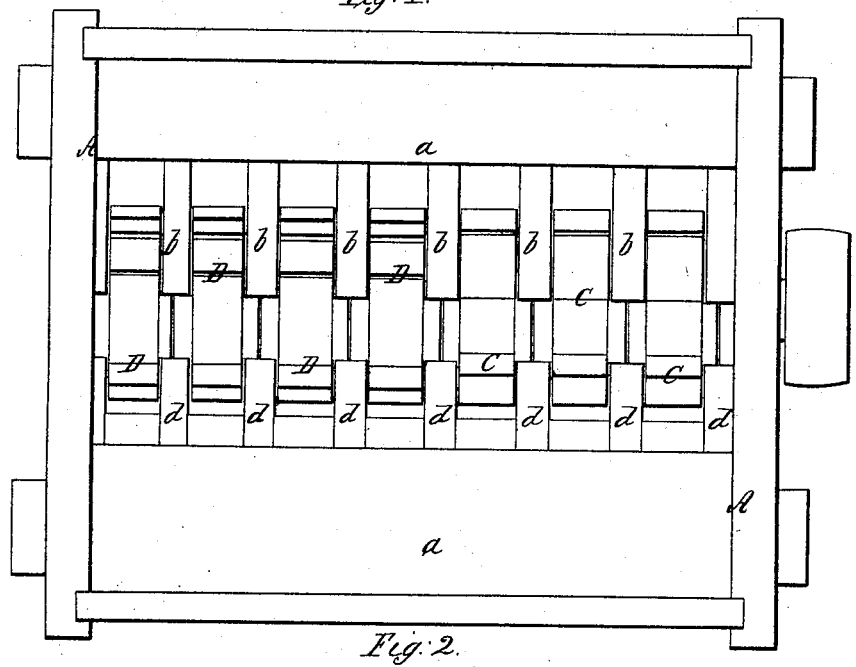

Figure 1 is a top view of the machine.

Figure 2:
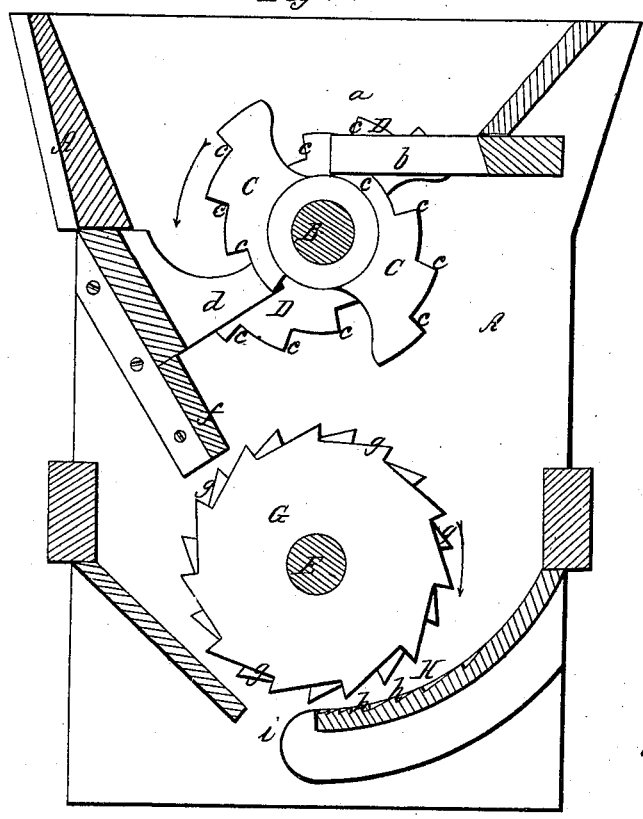

Figure 2, a transverse vertical section thereof.

Like letters designate corresponding parts in both figures.

In a suitable case is a long hopper, $a$. At the bottom of this hopper extends a breaker, the peculiar construction and operation of which constitute the first features of my invention.

Two sets of breaker-arms are arranged, one set, C C, at one end, being at right angles to the other set D D at the other end, upon the common shaft B, with which they revolve, so that there is a double crushing at each revolution of the shaft.

These breaker-arms have teeth $c\ c$ on their crushing edges, and they pass down between stationary bars $d\ d$, against which they crush the cobs to a considerable degree of fineness.

A grate of bars, $b\ b$, between which the breaker-arms ascend, prevents the ears from falling through on the wrong side of the breaker.

Beneath this double breaker, and parallel with it, is located a cylinder, G, provided with sharp cutting teeth $g\ g$, arranged alternately along its length, and around the entire circuit of its periphery, and revolving upon its shaft E, over a concave, H, which has oppositely-cutting teeth $h\ h$ on its surface. By the action of this cylinder and concave, the corn and cobs are finely divided.

The crushed cobs and corn are conducted from the breaker to the cylinder by a suitable inclined board, $f$, and the meal is finally discharged at an outlet, $i$, at the bottom of the machine.

I claim as my invention—

The breaker composed of the two sets of breaker-arms C C and D D, one set at one end projecting from their shaft B, in directions at right angles or thereabout to those of the other set at the other end of the shaft, substantially as and for the purpose herein specified.

This specification of my improved corn and cob-crusher signed by me this 9th day of June, 1869.

J. M. MOWRER.

Witnesses:
ISAAC T. BUFFINGTON,
JOHN F. MAIZE.